United States Patent [19]

Altmann et al.

[11] Patent Number: 5,403,076
[45] Date of Patent: Apr. 4, 1995

[54] HYDRAULIC VEHICLE BRAKE SYSTEM WITH AN ANTI-SKID SYSTEM

[75] Inventors: Rainer Altmann, Erligheim; Rainer Lauer, Weissach-Flacht; Anton Van Zanten, Ditzingen-Schoeckingen; Juergen Binder, Stuttgart; Michael-Raymond Meyer, Ludwigshafen, all of Germany

[73] Assignee: Robert Bosch GmbH, Stuttgart, Germany

[21] Appl. No.: 177,484

[22] Filed: Jan. 5, 1994

[30] Foreign Application Priority Data

Mar. 24, 1993 [DE] Germany .............. 43 09 470

[51] Int. Cl.⁶ ............................................. B60T 8/64
[52] U.S. Cl. ................................. 303/111; 303/100
[58] Field of Search ............. 303/100, 111, 3, 10, 303/15, 20; 364/426.02

[56] References Cited

U.S. PATENT DOCUMENTS

| | | | |
|---|---|---|---|
| 4,412,701 | 11/1983 | Burckhardt | 303/2 |
| 4,480,876 | 11/1984 | Sato et al. | 303/111 X |
| 4,809,183 | 2/1989 | Eckert | 364/426.02 |
| 4,836,620 | 6/1989 | Arikawa | 303/111 |
| 5,172,961 | 12/1992 | Inoue et al. | 303/111 |

FOREIGN PATENT DOCUMENTS

| | | |
|---|---|---|
| 4109925 | 10/1991 | Germany . |
| 11447 | 1/1990 | Japan .................. 303/111 |

*Primary Examiner*—Robert J. Oberleitner
*Assistant Examiner*—Lee W. Young
*Attorney, Agent, or Firm*—Edwin E. Greigg; Ronald E. Greigg

[57] ABSTRACT

A hydraulic motor vehicle brake system with dual brake circuits having an anti-skid system and is also further developed to improve vehicle tracking by ways of automatic braking, especially during cornering. During automatic braking, an auxiliary pressure source delivers a pressure medium to an anti-skid system to supply the wheel brakes. For this purpose a separating piston for each brake circuit is located between the auxiliary pressure source and the anti-skid system. For the purpose of keeping costs low, the two separating pistons are accommodated in an integral cylinder with a blind bore.

2 Claims, 4 Drawing Sheets

HYDRAULIC VEHICLE BRAKE SYSTEM WITH AN ANTI-SKID SYSTEM

FIELD OF THE INVENTION

The invention is based on a hydraulic brake system as defined hereinafter.

BACKGROUND OF THE INVENTION

A hydraulic vehicle brake system with an anti-skid system and a control device is known from U.S. Pat. No. 4,809,183. Furthermore, a hydraulic pressure source and at least one evaluating circuit are associated with the anti-skid system for detecting an oversteering tendency, an understeering tendency and the start of the danger of skidding, and for generating control signals for the anti-skid system, so that this system automatically brakes at least one wheel of the vehicle with the use of the hydraulic pressure source. The automatic braking stabilizes the vehicle, thus counteracting an oversteering tendency, an understeering tendency, or a danger of skidding, or skidding that is already in progress. The pressure source is not shown. To obtain the control signals, king pin inclinations are measured, for example, and compared with preselected threshold values. The rotating velocity of the vehicle around the vertical axis can also be observed by means of a gyroscope, for example. Alternatively, transverse accelerations can be measured by means of acceleration sensors associated with the axles and evaluated.

German Patent Disclosure DE 41 09 925 A1 discloses a hydraulic vehicle brake system with two advantageous, closed brake circuits and an anti-skid system that operates in accordance with the so-called recirculating pump principle, and in which a combination of a controllable 2/2-way valve and a cylinder with a separating piston and a restoring spring for the separating piston is installed for each brake circuit, between this anti-skid system and a main brake cylinder, to control the cornering of a vehicle; a common auxiliary pump and a 3/2-way valve disposed downstream of it are also provided for both brake circuits for controlled charging of the separating piston and to control the 2/2-way valves, which are hydraulically controllable by means of control inputs for closing the brake lines of the brake circuits between the cylinders and the main brake cylinder. Pressures generated in the cylinders after the main brake lines have been blocked are modulated by means of the anti-skid system and supplied individually to the wheel brakes of the four wheels. The anti-skid system can also individually reduce the pressures supplied to the wheel brakes. A control device that controls both the 3/2-way valve and the anti-skid system to improve the cornering of the vehicle equipped in this manner can also activate a driving motor for the auxiliary pump. The disadvantage is that, because of the hydraulic connection of the cylinders with modulation valve arrangements of the anti-skid system, the auxiliary pump must deliver a pressure at the level of the highest brake pressure to be expected during cornering. Correspondingly, the auxiliary pump must be embodied to be powerful; a required driving motor is heavy and stresses an electrical system of the vehicle in a disadvantageous manner. The heavy driving motor and the heavy auxiliary pump are expensive. A further disadvantage is that, because of the high pressure generated, disturbing and possibly very aggravating noises occur during pump operation. A reservoir that can be charged by the auxiliary pump is also expensive, as is the electrically controllable 3/2-way valve that controls the charging of the separating piston and the hydraulic control inputs of the 2/2-way valves. Moreover, because of the embodiment of the cylinder and its separating piston, the respective 2/2-way valve must be combined with a check valve function, so that during automatic brake operation the transition into normal brake operation can immediately take place solely through operation of the brake pedal. Therefore, in the disclosed exemplary embodiment the symbol of a check valve is allocated to the second position of the 2/2-way valves.

German Patent Application P 42 32 311.8 (DE 42 32 311 A1) proposes to embody a hydraulic vehicle brake system equipped with an anti-skid device that operates in accordance with the recirculating-pump principle and designed for automatic braking for the purpose of improving the driving performance of a vehicle during cornering, for example, and/or traction control at powered wheels, by means of the arrangement of pistons and cylinders and 2/2-way valves and an auxiliary pressure source for automatic braking such that, during automatic brake operation, the least possible noise is emitted from the auxiliary pressure source and the anti-skid device, and little driving energy is required. This is achieved in accordance with the proposal in that the auxiliary pressure source is embodied as a low-pressure source for charging the pistons, and that the cylinders supply intakes of recirculating pumps with a pressure medium, via controllable 2/2-way magnet valves, only when brake pressure is to be generated or increased in one of the respective wheel brakes downstream of the recirculating pumps. It can be considered disadvantageous that two separating pistons, of which each has its own associated brake circuit, respectively have their own cylinder that must be sealed tightly by means of a lid. Moreover, the one auxiliary pump used to hydraulically charge the two separating pistons is to be hydraulically connected to both cylinders.

SUMMARY OF THE INVENTION

The hydraulic vehicle brake system in accordance with the invention has the advantage that now only one integral cylinder and one lid are required for both separating pistons. Moreover, for hydraulic charging of the two separating pistons, only a single connection to the integral cylinder is required, further lowering the cost of installation into a vehicle.

An advantageous further development and improvement of the vehicle brake system disclosed is possible by means of the provision outlined herein. The advantage is that the hydraulic vehicle brake system can be constructed with the use of commercially available and thus low-priced pistons of the types used in tandem main brake cylinders. Because these commercially available pistons from tandem main brake cylinders already have elements that have proven themselves in practice, such as so-called primary cuffs, separating cuffs, sealing rings and possibly central valves, a higher degree of reliability of the hydraulic vehicle brake system is achieved in an economical fashion through their further use.

The invention will be better understood and further objects and advantages thereof will become more apparent from the ensuing detailed description of preferred embodiments taken in conjunction with the drawings.

DESCRIPTION OF THE PREFERRED EMBODIMENTS

First Exemplary Embodiment

Figure 1:
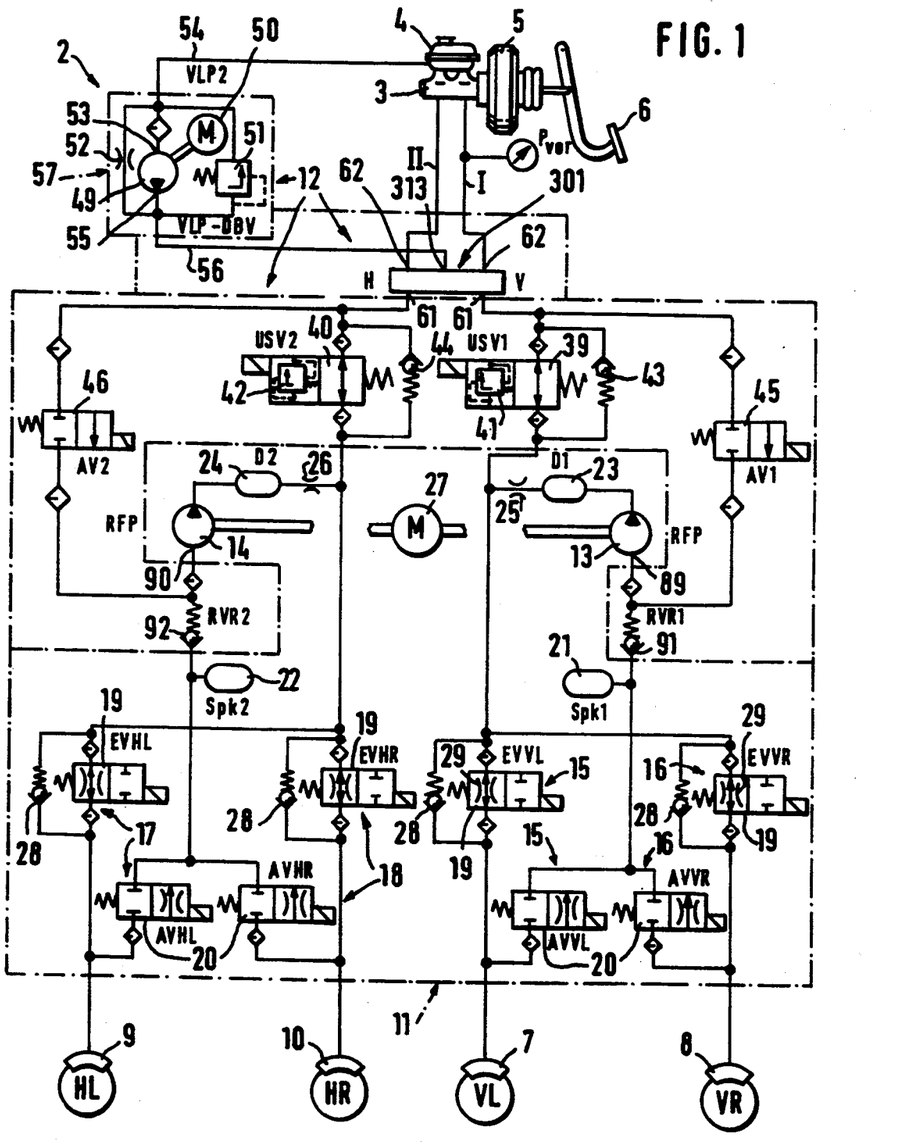
FIG. 1 shows a hydraulic circuit diagram for the hydraulic brake system of the invention.

The exemplary embodiment in FIG. 1 of the hydraulic vehicle brake system of the invention has a dual-circuit main brake cylinder 3 with a reservoir 4 that supplies the main brake cylinder and a pneumatic power brake 5, for example, as well as a brake pedal 6, two brake circuits I and II, front-wheel brakes 7 and 8 associated with brake circuit I, rear-wheel brakes 9 and 10 associated with wheel circuit II, an anti-skid system 11 disposed between the main brake cylinder 3 and the wheel brakes 7 through 10, and an additional device 12 for automatic braking.

The main brake cylinder 3 is embodied in a way that is known per se, and is operable with the aid of the brake pedal 6, so that brake pressures are generated in the brake circuits I and II. The effect of brake pedal 6 on the main brake cylinder 3 can be increased by the power brake 5. The reservoir 4 supplies the main brake cylinder 3 with a pressure medium that, for normal braking operation, can be pushed from the main brake cylinder 3 in the direction of the wheel brakes 7 through 10, through the additional device 12 and the anti-skid system 11.

The anti-skid system 11 is an anti-skid system of the so-called recirculating pump type, and in this case has a recirculating pump 13 for the brake circuit I and a recirculating pump 14 for the brake circuit II. Further, the anti-skid system 11 has a brake pressure modulation valve arrangement 15, 16, 17 or 18, comprised of a brake pressure buildup valve 19 and a respective braking pressure reduction valve 20, for each wheel brake 7 through 10, as well as a reservoir 21 or 22 for each brake circuit I and II. Moreover, a first damping chamber 23 for the brake circuit I, for example, and a second damping chamber 24 for the brake circuit II and a damping throttle 25 or damping throttle 26 are provided. A motor 27 is associated as the drive with the recirculating pumps 13 and 14. Starting at the wheel brakes 7 through 10, their respectively associated brake pressure buildup valves 19 can be bypassed in the direction toward the main brake cylinder 3 by means of check valves 28, which can be opened in the direction toward the main brake cylinder 3 in case of a drop in pressure above the respective brake pressure buildup valve 19, for example when this valve is switched into its blocked position, or when an installed throttle is effective when the valve is in its normal open position.

Anti-skid operation is possible by means of the said individual elements for the anti-skid system 11. For this purpose the brake pressure buildup valves 19 are normally in the open position and located between the respective wheel brakes 7 through 10 and the main brake cylinder 3, so that pressures generated in the main brake cylinder 3 can normally travel into the wheel brakes 7 through 10 by means of operation of the brake pedal 6. Respective braking pressure decrease valves 20 of the brake pressure modulation valve arrangements 15 and 16 or 17 and 18, likewise connected to the wheel brakes 7 through 10, are closed in the normal position and permit a throttling passage in the activated position, and communicate on the inlet side with the recirculating pump 13 of the brake circuit I or on the inlet side with the recirculating pump 14 of the brake circuit II. The damping chambers 23 or 24 are connected on the outlet side of the recirculating pump 13 or 14. The throttles 25 or 26 follow the damping chambers 23 or 24 in the direction toward the main brake cylinder 3 and the respective brake pressure buildup valves 9.

Figure 4:
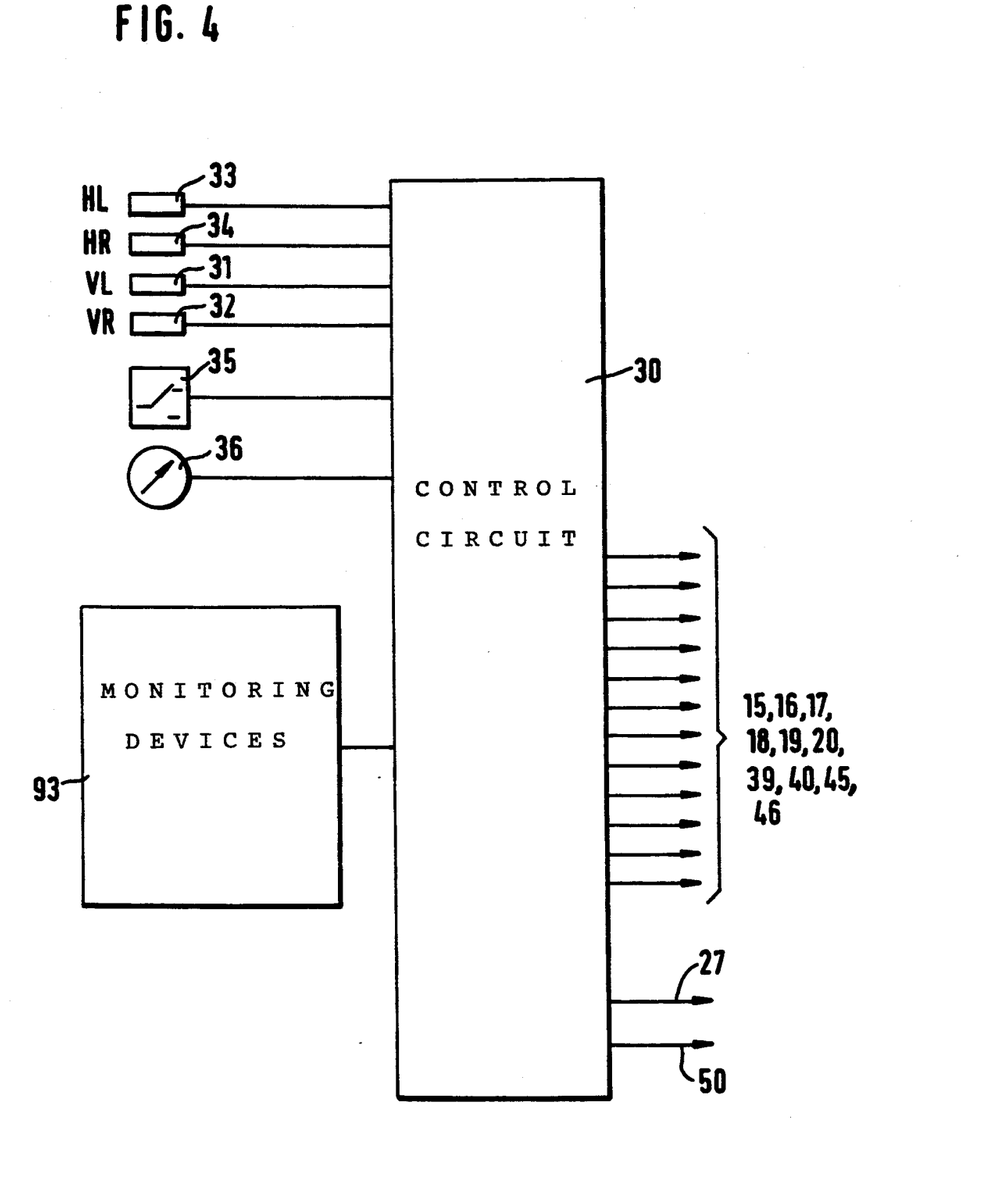
FIG. 4 shows an electrical block diagram for the hydraulic vehicle brake system of the invention.

A further control device 30, shown in outline in FIG. 4, is also part of the anti-skid system 11, as are the wheel revolution sensors 31 through 34 associated with the wheels, not shown, of the wheel brakes 7 through 10. The control device 30 is connected to these wheel revolution sensors 31 through 34. The individual valves 19, 20 of the brake pressure modulation valve arrangements 15 through 18 are connected on one side to the control device 30 itself, and the motor 27 is connected to it on the other side. Furthermore, a brake pedal switch 35 and/or, at the main brake cylinder 3, a pressure sensor 36, for example, that are connected to the control device 30 can be disposed in the region of the brake pedal 6.

Through the operation of the brake pedal 6, with the aid of the power brake 5, for example, pressure is generated in the main brake cylinder 3 that is propagated to the wheel brakes 7, 8, 9 and 10 through the open brake pressure buildup valves 19 of the two brake circuits I and II.

If the brake pedal 6 is increasingly strongly applied on a uniformly non-skid road surface, for example, the sequences of signals emitted by the wheel revolution sensors 31 through 34 are changed in a way that is ultimately interpreted by the control device 30 as a danger of wheel locking. Assuming that the danger of wheel locking threatens at all wheels at the same time and with the same intensity, the control device 30 activates the motor 27 and therefore the recirculating pumps 13 and 14, closes all of the brake pressure buildup valves 19 of the brake pressure modulation valve devices 15 through 18, and opens all associated braking pressure decrease valves 20. The consequence of this is that pressure that might still be increasing in the main brake cylinder 3 does not reach the wheel brakes 7 through 10; instead, quantities of pressure medium flow out of these wheel brakes to the storage chambers 21 or 22. As a consequence, these recirculating pumps 13 and 14 force the pressure medium through the damping chambers 23 and 24 and the throttles 25 and 26, and through the two brake circuits I and II, back to the main brake cylinder 3. After the danger of wheel locking has ceased, assuming that the danger of wheel locking happens to disappear simultaneously for all of the wheels 7 through 10, the brake pressure modulation valve arrangements 15 through 18 are brought into their base positions, in that the control device 30 halts the supply of control current necessary for the decrease in braking pressure. If, during a subsequent, preselected period of time no further danger of wheel locking occurs, for example, then the control device 30 also halts the current supply to the motor 27.

In a way known per se, for example, the control device 30 is also designed such that pressures of the front-wheel brakes 7 and 8 can be modulated individually and independently of one another, so that the best possible braking effect of the front wheels can be generated on roadways with partially varying frictional values. For instance, in right-side traffic, a low frictional value can be present to the right at the edge of a road as a consequence of ice formation, and a high frictional value can be present to the left under the vehicle across a dry stretch of road.

An individual control or regulating principle of this type can also be applied for the rear-wheel brakes 9 and 10, but a so-called "select-low" control, for example, is also used under certain conditions, i.e., if one of the rear wheels threatens to lock, the braking pressure in the wheel brake of the other rear wheel is also reduced. By means of this, the contribution made by the rear-wheel brakes to vehicle deceleration is reduced if need be; however, this can be of great advantage because it favors lateral guiding forces during the execution of a curve. In this case a favorable effect on driving performance is meant in the sense that a lateral drifting of the rear wheels out of the curve can be suppressed. The said "select-low" control of the rear-wheel brakes 9 and 10 is therefore a useful measure for affecting the motion pattern of the vehicle, particularly the rotating behavior around the center of gravity or the vertical axis of the vehicle. An undesired angular deceleration of the vehicle around the vertical axis, that is, inherent dynamics of the vehicle, can thus be counteracted in the described manner.

An integral cylinder 301, respectively one pressure-limiting valve 41 or 42 and, for safety reasons, respectively one check valve 43 or 44 are part of the device 12 for automatic braking inside the brake circuits I and II, respectively. Moreover, 2/2-way valves 45 and 46 as well as check valves 91 and 92 are associated on the inlet side with the recirculating pumps 13 or 14. For indirect supply, an auxiliary pump 49 with an auxiliary motor 50, an auxiliary pressure-limiting valve 51 and a throttle 52 are also part of the device 12.

The auxiliary motor 50 is connected to the control device 30 and can be activated by the control device 30, so that the auxiliary pump 49 can be driven. The auxiliary pump 49 has an inlet 53, which in the example is connected to the reservoir 4 of the main brake cylinder 3 via a line 54. An outlet 55 is connected to the integral cylinder 301 via an auxiliary pressure line 56. The auxiliary pressure-limiting valve 51 is connected on the inlet side to the outlet 55 of the auxiliary pump 49, and can be opened in the direction toward the inlet 53 of this auxiliary pump 49 or the line 54, which communicates with the reservoir 4. For example, the auxiliary pressure-limiting valve 51 is designed such that it can open at a pressure of a magnitude of 5 to 15 bar. The throttle 52 is likewise connected to the outlet 55 of the auxiliary pump 49 and communicates on the other side with the line 54 and the inlet 53 of the auxiliary pump 49. When the auxiliary pump 49 is stopped, the throttle 52 assures the elimination of differences in pressure between the outlet 55 and the inlet 53. The listed elements form a controllable auxiliary pressure source 57 because of the cooperation of the control device 30 with the auxiliary motor 50.

Figure 2:
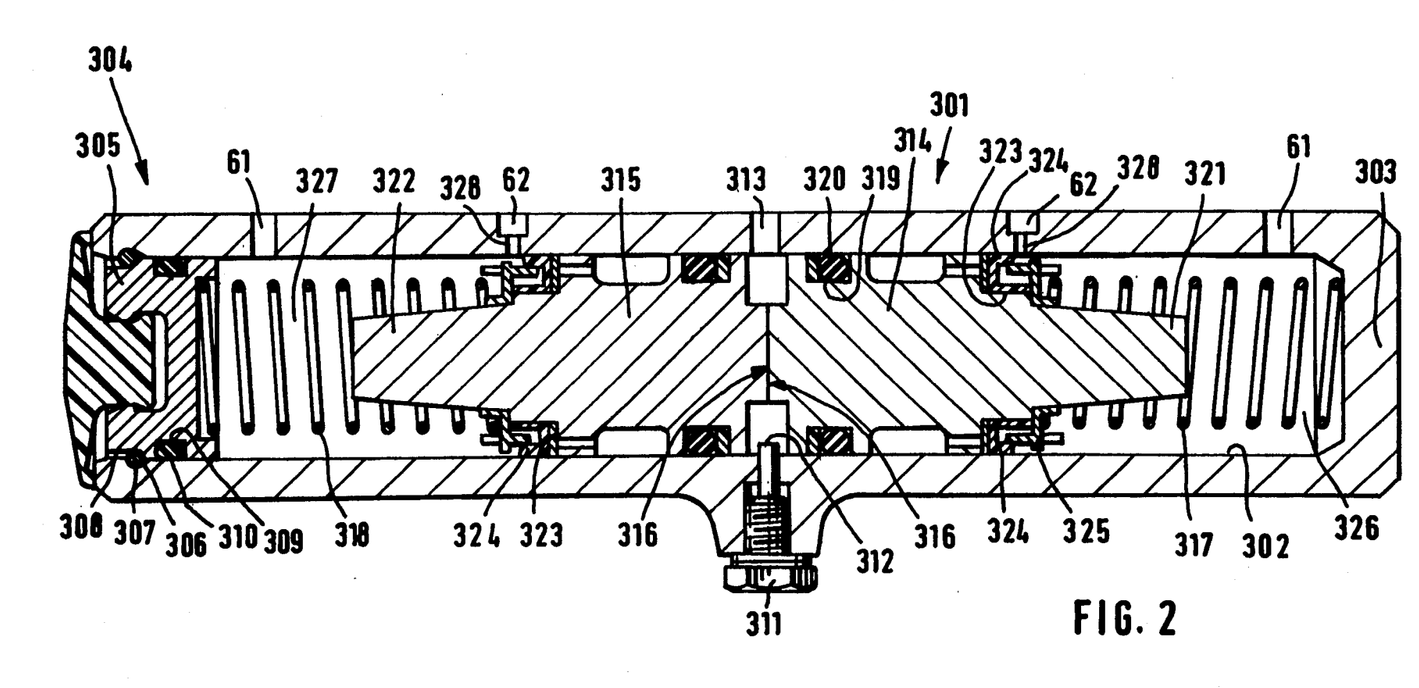
FIG. 2 shows a first exemplary embodiment of a detail of the hydraulic vehicle brake system in accordance with FIG. 1.

A blind bore 302 is located inside the integral cylinder 301 and terminates at a front wall 303. The blind bore 302 is sealed at its beginning 304 by means of a lid 305. The lid 305 is held inside the blind bore 302 by means of a wire ring 306, which dips into a groove 307 starting at the blind bore 302. The lid 305 has a shoulder 308 associated with the wire ring 306. This lid 305 has a groove 309 at its circumference, in which a sealing ring 310 is seated. The sealing ring 310 prevents the exit of pressure medium from the blind bore 302. A stop screw 311 penetrates the integral cylinder 301 in the radial direction in a plane of reference imagined to be crosswise with respect to the integral cylinder 301, between the front wall 303 and the lid 305, and dipping with a stop tappet 312 into blind bore 302. The integral cylinder 301 has an auxiliary pressure connection 313, essentially in the said plane of reference, that communicates with the blind bore 302. This auxiliary pressure connection is connected to the auxiliary pressure line 56.

On both sides of the said plane of reference, the blind bore 302 forms cylinder bores for two separating pistons 314, 315, which are oriented with the primary-side ends 316 opposite one another. Two separating piston restoring springs 317 and 318 of the same type are respectively supported against the front wall 303 or the lid 305, and load the separating pistons 314 and 315 against one another. When the primary-side ends 316 and 317 of the separating pistons 314 or 315 approach one another by means of this, the stop tappet 312 insures a base position of the two separating pistons 314 and 315, as revealed in FIG. 2. It is shown in FIG. 2 that the primary-side ends 316 of the two separating pistons 314 and 315 can be charged through the auxiliary pressure connection 313 with pressure medium pressure that the auxiliary pressure source 57 can deliver through the auxiliary pressure line 56. Adjoining its primary-side end 316 or 317, each separating piston 314 or 315 has at least one circumferential groove 319 and at least one sealing ring 320 inserted into the circumferential groove 319. At an axial distance in the direction toward the respective secondary-side end 321 or 322, each separating piston 314 or 315 has a cuff seal 324 in the region of a shoulder 323 that is secured relative to its shoulder 323 with the aid of a support ring 325, by means of prestressing provided to the respective separating piston restoring spring 317 or 318 during installation. Because the separating pistons 314 and 315 can be embodied with the identical design as pistons of tandem main brake cylinders, which separate the two brake circuits from one another inside tandem main brake cylinders, the description of the design for the two separating pistons 314 and 315 is sufficient. Therefore it is only pointed out that such pistons can be supplied by the firm of Alfred Teves GmbH, 6000 Frankfurt 90, Germany, for instance.

A blow opening 328, which is open when the separating piston 314 or 315 is in the base position, discharges in a respective secondary chamber 326 or 327 between the separating piston 314 and the front wall 303, or between the separating piston 315 and the lid 305, near the respective cuff seal 324. When the separating piston 314 is displaced in the direction toward the front wall 303, or the separating piston 315 is displaced in the direction toward the lid 305, the cuff seal 324 passes across the respective blow opening 328. A connection 62 communicates with the respective blow opening 328, and the connections 62 communicate with the main brake cylinder 3 by means of the brake circuits I and II.

Moreover, a further connection 61 is associated with each of the secondary chambers 326 and 327; these connections 61 are positioned such that they remain open despite the displacement of the respective separating piston 314 or 315. The connections 61 are connected to the already-described anti-skid device 11. It can be derived from the previous description that in the shown base positions of the separating pistons 314 and 315, the respective blow opening 328 is open. The consequence of this is that, as long as the separating pistons 314 and 315 assume their initial position or normal position, the integral cylinder 301 is penetrable for pressure medium forced out of the main brake cylinder 3 into the brake circuits I and II by means of the actuation of the brake pedal 6, and that it can flow through the integral cylinder 301 into the anti-skid device 11, and from there to the wheel brakes 7 through 10.

If the primary-side ends 316 and 317 of the two separating pistons 314 and 315 are hydraulically charged by means of the activation of the auxiliary pressure source 57, the separating pistons 314 and 315 are displaced counter to the forces of their separating piston restoring springs 317 and 318, and the respective cuff seal 324 passes across the associated blow opening 328. The consequence of this is that the secondary chambers 326 or 327 are blocked relative to the main brake cylinder 3. To this extent the cuff seals 324 and the blow openings 328 act as elements of valves, and in this way form two 2/2-way valves inside the integral cylinder 301 that can be controlled hydraulically, namely by means of auxiliary pressure. On the other hand, however, the separating pistons 314 and 315 also serve to transfer the auxiliary pressure of the auxiliary pressure source 57 into the anti-skid device 11.

As already indicated, the connections 61 of the integral cylinder 301 communicate with the brake pressure buildup valves 19 of the brake pressure modulation valve arrangements 15 and 16 and 17 and 18 via the normally open reversing valves 39, 40 of the brake circuits I and II. Bypasses that can be opened in the direction toward the said brake pressure modulation valves by means of the check valves 43 are disposed in the direction from the integral cylinder 301 to the brake pressure modulation valve arrangements 15 and 16 and 17 and 18.

The reversing valves 39, 40 are preferably combined with the pressure-limiting valves 41, 42 so that, with electrical activation, instead of free passages, passages in the direction toward the main brake cylinder 3 only result when sufficient drops in pressure predominate between the brake pressure buildup valves 19 and the main brake cylinder 3. These are of such a magnitude that when the main brake cylinder 3 is not operated, the pressure present in front of the pressure-limiting valves 41, 42 is sufficient for automatic braking and, if necessary, blockage of wheels.

The 2/2-way valves 45 and 46 are closed in their normal positions, and can be opened electrically. These 2/2-way valves 45 or 46 are located between the connections 61 of the integral cylinder 301 and inlets 89, 90 of the recirculating pumps 13 or 14. For the purpose of decoupling the secondary chambers 326, 327 of the integral cylinder 301 from the storage chambers 21 or 22, the said check valves 91 or 92 are disposed between these and the 2/2-way valves 45 or 46. These check valves 91 and 92 can be considered to be part of the device 12, because the execution of anti-locking operation alone renders these check valves 91 and 92 unnecessary with the use of so-called free-piston pumps as recirculating pumps 13, 14.

In FIG. 4, a black box 93 is associated with the additional device 12. The black box 93 includes means such as those mentioned in the introduction to the description for monitoring the vehicle for the start of the danger of skidding. Therefore only the key terms are mentioned here, such as gyroscope and monitoring of the angular acceleration, acceleration sensors, expanded use of wheel revolution sensors and wheel-skid measuring devices and threshold value switches for obtaining control signals that act on the control circuit 30 and, via this control circuit, control the auxiliary pressure source 57, the recirculating pumps 13 and 14, and the brake pressure modulation valve arrangements 15 through 18, the reversing valves 39 and 40 and the 2/2-way valves 45 and 46.

If a danger of skidding occurs because of so-called oversteering of the vehicle during an unbraked execution of a curve in a vehicle equipped in accordance with the invention, for example, this is detected by the monitoring device outlined with the black box 93 that, when a predetermined limit value has been exceeded, controls the brake pressure buildup valves 19 of the rear-wheel brakes, activates the auxiliary motor 50, opens the 2/2-way valve 45, closes the reversing valve 39 and activates the motor 27 for driving the recirculating pump 13. By means of this, the auxiliary pump 39 generates an auxiliary pressure that travels through the line 56 into the integral cylinder 301 and displaces the separating pistons 314, 315. In the process, the separating pistons 314, 315 pass across the blow opening 328 with their cuff seals 324; pressures are generated in the secondary chambers 326, 327 such that pressure medium flows out of the secondary chamber 326, through the 2/2-way valve 45 to be opened, to the inlet 89 of the recirculating pump 13, and through the check valve 43 to the wheel brake cylinders 7 and/or 8. In this way, the recirculating pump 13 is indirectly filled by means of auxiliary pressure supplied into the integral cylinder 301 so that the pump can build up a pressure ahead of the closed reversing valve 39 that travels through the open brake pressure buildup valves 19 of the brake pressure modulation valve arrangements 15 and/or 16 and into the wheel brakes 7 and 8. Correspondingly, one or both of the front wheels are braked in this case, for example, because of which the lateral guiding forces of at least one of the front wheels are reduced, as the prior art teaches. This has the desired effect that lateral skidding also results at the front or is increased to a magnitude or possibly beyond the magnitude of the lateral skidding of the rear wheels. This has the intended effect that an increase in the rotating velocity of the vehicle around the vertical axis, that is, skidding, is counteracted, or skidding is halted.

When an intended braking pressure in the above sense is attained, the brake pressure buildup valves 19 of the brake pressure modulation valve arrangements 15 and/or 16 are closed, by means of which at least initially the braking pressures in the wheel brakes 7 and 8 remain constant.

Because a surplus of pressure medium conveyed from the recirculating pump through the pressure-limiting valve 41 during such a period of time would cause a useless energy consumption and disturbing pumping noise, the 2/2-way valve 45 can be temporarily closed by means of the control device 30 during such a period of time. Because of this, the inlet 89 of the recirculating pump 13 receives no pressure medium, and the recirculating pump runs empty.

If the means disposed inside the black box 93 detect that a skidding danger has been sufficiently counteracted, that is, that a fall below a preselected threshold value has occurred, the braking pressure first contained in the wheel brakes 7 and/or 8 can be at least partly reduced. This is achieved by the opening of the braking pressure reduction valves 20 of the brake pressure modulation valve arrangements 15 and/or 16.

By means of this, pressure medium travels out of the wheel brakes 7 and/or 8 to the storage chamber 21, and finally also through the check valve 91 into the recirculating pump, from where it is forced back through the pressure-limiting valve 41 into the integral cylinder 301. In the process, the separating piston 314 recedes counter to the low auxiliary pressure set by the auxiliary pressure-limiting valve 51.

When a new pressure buildup is required, the 2/2-way valve 45 is opened, by means of which the recirculating pump 13 can build up pressure again that is then to be conveyed to the wheel brakes 7 and/or 8 in the above-described manner, by means of the brake pressure buildup valves 19.

In the described case, only wheel brakes 7 and/or 8 are used to improve cornering of the vehicle. For the previously described case, the premise was the danger of skidding by means of drifting of the rear axle, i.e., a so-called understeering tendency. Vehicles with an oversteering tendency are widespread, but there are also vehicles with an understeering tendency. Depending on the type of load, it can even occur that a vehicle has an oversteering tendency at one time and an understeering tendency at another.

If the understeering tendency occurs, the dynamics resulting from inadequate lateral guiding force of the front wheels can be counteracted in a compensating manner in that lateral guiding forces of at least one of the rear wheels are automatically reduced. For this purpose braking forces should be automatically supplied to the rear-wheel brakes 9 and/or 10. This occurs in the same sense as described for the wheel brakes 7 and 8 of the front wheels, with the use of the separating piston 315, the 2/2-way valve 46, the recirculating pump 14 and the reversing valve 40. Thus, another precise description that would only be distinguished from the preceding one by different reference numerals is superfluous.

The danger of skidding can arise not only when driving at an essentially uniform speed, but it can also be triggered by means of braking during cornering. This occurs in particular because a dynamic increase in the load on the front wheels and a dynamic reduction in the load on the rear wheels arise during braking, although the center of gravity of the vehicle retains its orientation relative to the front axle and the rear axle. Lateral guiding forces of the rear wheels clearly tend to be weaker relative to the lateral guiding forces of the front wheels, so that an angular acceleration of the vehicle around its center of gravity can be set in, and an unacceptable limit value can be attained. In this case it is necessary to automatically increase a braking pressure selected for the front wheel brakes 7 and 8 by the driver, by operating the brake pedal 6. This is also possible through the startup of the additional device 12 and the anti-skid system 11. With this startup the combination of the anti-skid system 11 and the additional device 12 for automatic braking dominates the driver's judgment. If the driver has already braked, the automatic brake operation causes an increased braking pressure, at least for one of the front-wheel brakes, so that the sum of the lateral guiding forces of the front wheels is reduced, as with the prior art described in the introduction.

Because it can be seen that the vehicle braking system is in the position to automatically inject braking pressures individually into all wheel brakes of four vehicle wheels, thanks to the four brake pressure modulation valve arrangements 15 through 18, this vehicle braking system is also suited for executing traction control, regardless of whether the front wheels or the rear wheels, or the front and rear wheels are powered. Traction control is executed in accordance with the known requirements, again with the use of the auxiliary pump 49 and the integral cylinder 301, as well as the reversing valves 39, 40, the 2/2-way valves 45 and 46 and the anti-skid system 11 in the case of traction control at all four wheels. Because traction control devices are noted for powered front wheels, to which are assigned diagonal brake circuits, and also for rear wheels, for the majority of which a front-back brake circuit division is selected, a description of control or function for traction control is superfluous.

Depending on the situation, it can become necessary during traction control operation to further increase the braking pressure present in this case in the respective wheel brakes by means of operating the brake pedal. This can be achieved by means of surrounding at least one of the cuff seals 324 with flow. By means of a sufficient increase in the force on the brake pedal, the main cylinder pressure increases to the point that it sufficiently exceeds the auxiliary pressure to cause the cuff seal 324 to act as a check valve. If, at this point in time, the reversing valve 39 of the front-wheel brakes, which have wheels that can be powered should still be closed, the pressure opens the check valve 43, which forms a bypass around the still impassable reversing valve 39, so that an increase in braking pressure in the wheel brakes 7 and 8 is possible in the way desired by the driver. Although during the course of this, the separating piston 314, because it is charged with a pressure from the secondary chamber 326 that is higher than the auxiliary pressure, will yield in the direction of its initial position with respect to the stop tappet 312, this does not cause an interfering disadvantage, because previously the wheel brakes 7 and 8 were filled by the displacement of the separating piston 314 by only the auxiliary pressure.

FIG. 1 is provided with reference numerals for front-wheel brakes and rear-wheel brakes in such a manner that the brake circuit I is a so-called front-axle brake circuit and brake circuit II is a so-called rear-axle brake circuit. A brake circuit division of this type is also characterized as a II-brake-circuit division. The concept of the invention is not limited to such II brake circuits, however, because it is apparent that so-called diagonal brake circuits, characterized as X brake circuits, can be achieved by means of switching the reference numerals of front- and rear-wheel brakes. In this case all four wheels can be automatically supplied individually with braking pressures, thus counteracting a disadvantageous dynamic individual behavior of the vehicle.

Second Exemplary Embodiment

Figure 3:
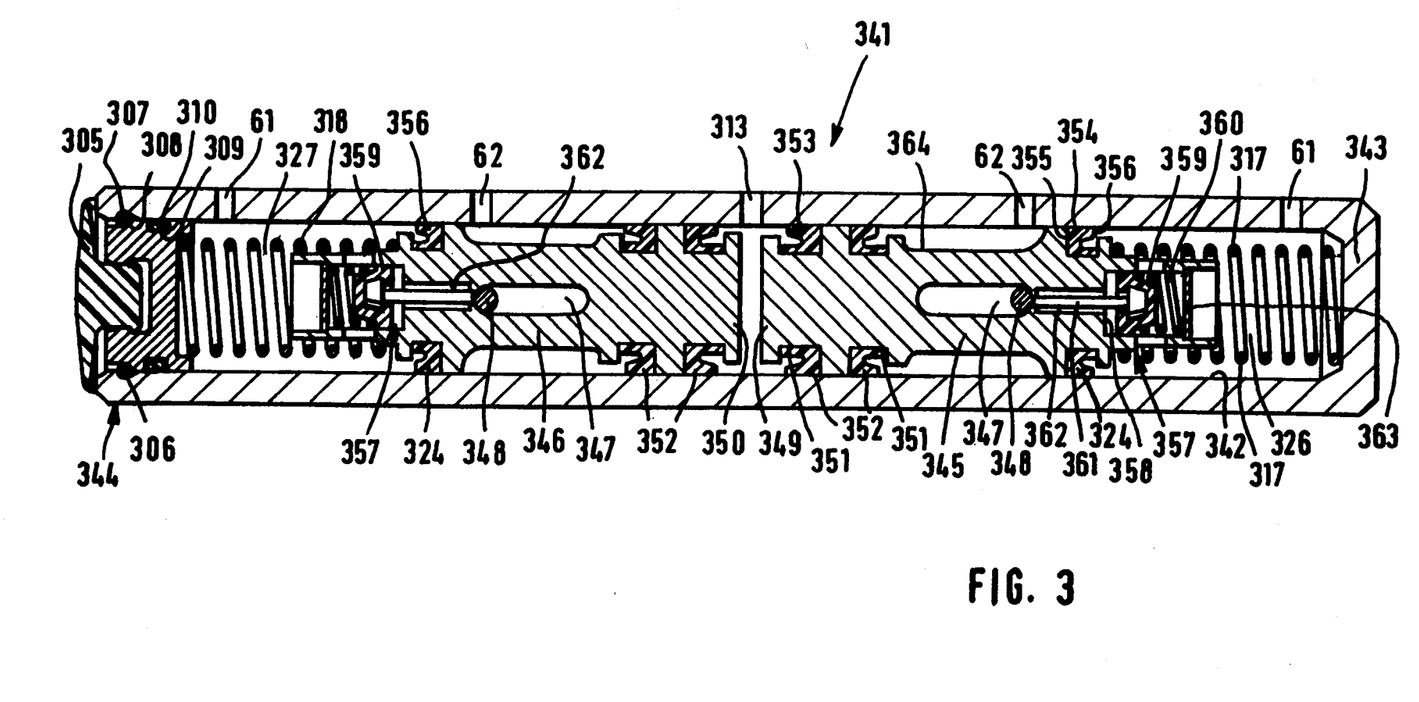
FIG. 3 shows a second exemplary embodiment of a detail of the hydraulic vehicle brake system in accordance with FIG. 1.

The second exemplary embodiment in accordance with FIG. 3 is distinguished from the first exemplary embodiment in accordance with FIGS. 1 and 2 with the integral cylinder 301 by means of an integral cylinder 341 that is embodied differently in detail.

The integral cylinder 341 likewise has a blind bore 342 that terminates at a front wall 343. The integral cylinder 341 also has a beginning 344 of the blind bore 342. This beginning 344 is embodied identically to the beginning 304 of the first exemplary embodiment, and again an already-mentioned lid 305 is used. The lid 305 is again secured axially by means of a wire ring 306, which dips at one end into a groove 307 located in the beginning 342 and, at the other side, cooperates with a shoulder 308 located on the lid 305. A groove 309, into which a sealing ring 310 is inserted, is also cut into the lid 305. This sealing ring 310 prevents the loss of pressure medium from the integral cylinder 341. The integral cylinder 341 likewise has an auxiliary pressure connection 313 between the front wall 343 and the lid 305. A first separating piston 345 is displaceably disposed between the auxiliary pressure connection 313 and the front wall 343, and a second separating piston 346 is displaceably disposed between the auxiliary pressure connection 313 and the lid 305. In a longitudinal axis, each separating piston 345, 346 has a slitlike recess 347, through which a stop pin 348 extends. Each stop pin 348 is secured relative to the integral cylinder 341, for instance by means of radial bores that are not shown. Again, a separating piston restoring spring 317, which can be taken from the first exemplary embodiment, is located between the separating piston 345 and the front wall 343. In the same way, the separating piston restoring spring 318 from the first exemplary embodiment is associated with the separating piston 346. Because of the arrangement of the separating piston restoring springs 317 and 318, the separating pistons 345 and 346 assume the initial position shown in FIG. 3, wherein the primary-side ends 349 or 350 of the separating pistons 345 and 346 are oriented toward each other in the region of the auxiliary pressure connection 313. Between the primary-side ends 349 or 350 and their recesses 347, the separating pistons 345 and 346 have sealing rings 352 inserted into circumferential grooves 351. In the present example, the sealing rings 352 are embodied in the manner of cuff seals, and thus disposed in pairs per separating piston 345 or 346. The cuff seals have sealing lips 353, of which those located closest to the auxiliary pressure connection 313 point toward it. The two other sealing lips point toward the front wall 343, or toward the lid 305. Between the stop pins 348 and the front wall 343 or the lid 305, each of the separating pistons 345, 346 has a cuff seal 355 with respectively a sealing lip 356 disposed in a circumferential groove 354. The sealing lip 356 associated with the separating piston 345 points toward the front wall 343; the sealing lip associated with 356 associated with the separating piston 346 points toward the lid 305. In the second exemplary embodiment, the cuff seals 355 also have no valve function to perform. In the second exemplary embodiment, a so-called central valve 358 is installed in each separating piston 345 or 346 for the valve function. At each separating piston 345 or 346, each central valve 357 has a valve seat 358, a valve seal 359, a valve spring 360 and a valve pin 361. The valve spring 360 loads the valve seal 369 in the direction toward the valve seat 358. A valve aperture 362 leads from the valve seat 358 in the direction toward the respective stop pin 348 and discharges in the respective recess 347. The valve spring 360 is supported in the prestressed state against a spring plate 363, which in turn catches in the respective separating piston 345 or 346. Because such separating pistons 345 and 346 can be embodied identically to main cylinder pistons taken from tandem main brake cylinders and that have central valves that hydraulically separate the respectively two brake circuits from one another, a more precise description of the design details of the separating pistons 345 and 346 is superfluous. It is only pointed out that the said piston for a tandem main brake cylinder can be supplied by the above-mentioned company, Alfred Teves GmbH.

Once again, a secondary chamber 326 is located between the separating piston 345 and the associated front wall 343, and a secondary chamber 327 is located between the separating piston 346 and the lid 305. Both secondary chambers 345 and 346 have respectively one connection 61, which communicates in accordance with FIG. 1 with the anti-skid system 11 represented therein. Connections 62, which communicate with the main brake cylinder 3 via the brake circuits I and II, communicate in the second exemplary embodiment with constrictions 364 disposed on the separating pistons 345 and 346, between the cuff seals 355 and the pairs of sealing rings 352. These constrictions 364 communicate with the respective recess 347. Because the valve pins 361 are embodied sufficiently long that they lift the valve seals 359 from the respective valve seat 350 when the separating pistons 345 and 346 are in their initial positions, as shown, there is a free passage to the connection 61, which communicates with the anti-skid system 11 and starts at each connection 62 on the side of the main brake.

Through hydraulic charging by means of pressure through the auxiliary pressure connection 313 of the primary-side ends 349 and 350 of the separating pistons 345 and 346, these pistons are displaceable in the direction toward the front wall 343 or the lid 305. The consequence of this is that first the valve pins 361 remain in contact with the stop pins 348 and, because of this, the valve seats 358 impact against the valve seals 359. In this way, the central valves 357 act as controllable 2/2-way valves 357. On the other hand, however, it can also be seen that, when the valve springs 360 are embodied to be soft and are installed with little prestress, the central valves 357 can act as check valves if a pressure acting on the respective connection 62 is higher to a sufficient degree than a pressure existing in the respective secondary chamber 326 or 327 and at the respective connection 62. To this extent, in contrast to the exemplary embodiment in FIG. 2, a 2/2-way valve that can be operated in the manner of a check valve in the same direction of a drop in pressure is additionally provided for a valve effect of the cuff seals 355 in the same manner as that of a check valve.

The concept essential to the invention is also revealed in the second exemplary embodiment in FIG. 3: that two identically-embodied separating pistons 345 and 346 can be accommodated to face each other, with their primary-side ends 349 or 350 in an integral cylinder 341, wherein the integral cylinder 341 requires only a sealing lid 305.

Function of the Second Exemplary Embodiment

As already described, the separating pistons 345 and 346 are normally located in their initial positions, which are effected by the springs 317 or 318, and the central valves 357 are open. As a consequence, through the operation of the main brake cylinder 3 by means of the brake pedal 6, brake pressures can be conveyed through the integral cylinder 341, into the anti-skid device 11 and through this device to the wheel brakes 7 through 10 of a vehicle equipped in this manner.

When, in the case of such normal braking, anti-skid operation becomes necessary, the anti-skid device 11 will operate in the same way as in the first exemplary embodiment. Quantities of pressure medium that are not needed in the wheel brakes 7, 8, 9 or 10 are pumped back through the integral cylinder 341 and its central valves 357 to the main brake cylinder 3 by the recirculating pump 13 and/or 14.

Should it happen that automatic braking is to be implemented, then the monitoring device 93 sketched by means of the black box 93, together with the control device 30, activates the pressure source 57, the device 12 and the anti-skid device 11, in the course of which its recirculating pumps 13 and 14 are activated, and the various valves are opened in the way described for the first exemplary embodiment. To this extent there is no difference from the exemplary embodiment of FIG. 1. Activation of the auxiliary pressure source 47 again causes the separating piston(s) 345 or 346 to be displaced, the central valve acting at the time as a 2/2-way valve to close and, by means of this, a pressure to be generated in the respective secondary chamber 326 or 327 that is practically as high as the auxiliary pressure delivered by the auxiliary pressure source 57.

It is also possible in this exemplary embodiment that, during automatic braking, brake pressure is increased in the wheel brakes above that pressure generated by the driver by means of operation of the brake pedal 6. This is possible because, during the transition into automatic brake operation, the pressure present in the secondary chambers 326 or 327 is not used directly in the generation of the brake pressure in the wheel brakes, but because this pressure makes pressure means from the respective secondary chamber available to the recirculating pumps 13 or 14 through at least one of the 2/2-way valves 45 or 46 to generate a brake pressure. In this case the pressure from the main brake cylinder 3 only serves to supply pressure means to the at least one recirculating pump.

The foregoing relates to preferred exemplary embodiments of the invention, it being understood that other variants and embodiments thereof are possible within the spirit and scope of the invention, the latter being defined by the appended claims.

what is claimed and desired to be secured by Letters Patent of the United States is:

1. A hydraulic vehicle brake system having a dual-circuit main brake cylinder, a reservoir for the main brake cylinder, first and second brake circuits for wheel brakes of a motor vehicle, an anti-skid system associated with the wheel brakes that has brake pressure modulation valve arrangements and a recirculating pump (13, 14) for each brake circuit, an automatic braking system in cooperation with the anti-skid system, at least one 2/2-way valve (324, 328, 357) for each brake circuit between said dual circuit main brake cylinder, the reservoir and the anti-skid system, said at least one 2/2-way valve for each brake circuit is connected with said brake cylinder and reservoir and, connected to the anti-skid system, an integral cylinder (301): a uniform diameter cylinder bore in said integral cylinder a separating piston displaceably disposed in said cylinder bore for each brake circuit, said separating pistons separate a secondary chamber from a primary chamber in said cylinder bore, said integral cylinder includes a separating piston restoring spring for each piston, and said automatic braking system includes a common auxiliary pump (49) for both brake circuits, wherein during automatic brake operation the auxiliary pump supplies pressure to displace the separating pistons and close the 2/2-way valves (324, 328, 357), and a control device for controlling the anti-skid system to avoid a danger of wheel locking, and the automatic braking system for automatic braking, the cylinder bores of the two separating pistons (314, 315; 345, 346) are oriented on the same axis, and embodied as a blind bore (303; 344) and accommodated in a common integral cylinder (301; 341); that an end opening (304; 344), of the blind bore (302; 342) is sealed with a lid (305); that both separating pistons (314, 315; 345, 346) are disposed oriented toward each other with their primary-side ends (316; 349, 350) between separating piston restoring springs (317, 318); and that an auxiliary pressure connection (313) is disposed in the integral cylinder (301; 341), which discharges between the separating pistons, and is supplied from said auxiliary pump (49).

2. The hydraulic vehicle brake system of claim 1 in which the separating pistons (314, 315; 345, 346) are embodied in a manner of pistons and are disposed between two brake circuits (I, II) for their hydraulic separation.

* * * * *